United States Patent [19]

Stubbs et al.

[11] Patent Number: 5,626,100
[45] Date of Patent: May 6, 1997

[54] UNIVERSAL HEADGATE

[75] Inventors: Reid K. Stubbs, Genoa, Utah; Willard B. Walch, deceased, late of Bountiful, Utah, by Nancy G. Walch, successor

[73] Assignee: Powder River, Inc., Provo, Utah

[21] Appl. No.: 435,491

[22] Filed: May 5, 1995

[51] Int. Cl.⁶ .................................................. A01K 1/062
[52] U.S. Cl. ................................................... 119/734
[58] Field of Search ................................. 119/729, 731, 119/734, 736, 739, 740, 741, 745, 746

[56] References Cited

U.S. PATENT DOCUMENTS

| | | | |
|---|---|---|---|
| 782,566 | 2/1905 | Knickerbocker | 119/745 |
| 821,454 | 5/1906 | Bidwell | 119/736 |
| 847,806 | 3/1907 | McGuire | 119/746 |
| 1,088,862 | 3/1914 | Wood | 119/746 |
| 3,799,117 | 3/1974 | Tribbey | 119/734 |
| 4,059,073 | 11/1977 | Roark | 119/730 |
| 4,167,155 | 9/1979 | Wade et al. | 119/730 |
| 4,302,908 | 12/1981 | Parker | 49/122 |
| 4,513,690 | 4/1985 | Waldron | 119/734 X |
| 4,517,924 | 5/1985 | McCan et al. | 119/734 |
| 4,579,084 | 4/1986 | McCan et al. | 119/731 |
| 4,702,200 | 10/1987 | Simington | 119/734 |
| 4,771,737 | 9/1988 | Lynch | 119/734 |
| 4,947,800 | 8/1990 | Widney | 119/734 |
| 5,065,701 | 11/1991 | Punt | 119/729 |

*Primary Examiner*—Robert P. Swiatek
*Assistant Examiner*—Yvonne R. Abbott
*Attorney, Agent, or Firm*—Ormiston Korfanta Dunbar & Holland, PLLC

[57] ABSTRACT

A headgate that includes a pair of spaced apart stanchions operable to move from an open position to a closed position in which the animal is confined about its neck. A pair of opposing yokes, made of a durable resilient material such as rubber or plastic, are positioned along the stanchions to define in part the size and shape of the opening in the headgate within which the animal is confined when the stanchions are in a closed position. The size and shape of this opening may be easily adjusted, as desired, by varying the number, size and shape of the yokes and adjusting their spacing along the stanchions.

20 Claims, 6 Drawing Sheets

UNIVERSAL HEADGATE

FIELD OF THE INVENTION

The invention relates to livestock headgates for use with squeeze chutes, calving and maternity pens, and the like.

BACKGROUND OF THE INVENTION

Headgates are commonly used to restrain livestock, usually in conjunction with a squeeze chute or other type of containment pen, during inspection, branding, doctoring and other such animal handling activities. Various diverse types of headgates, squeeze chutes and containment pens are known in the livestock industry. The most commonly used headgates restrain an animal about its neck with either a set of swing doors that pivot in an out of a vertical plane or a pair of opposing stanchions that pivot within a vertical plane by means of a scissor action. Both types of headgates utilize substantially parallel upright metal posts to define the opening in which the animal's neck is confined when the headgate is in the closed position. Typically, the upright metal posts are bent to conform somewhat to the shape of the animal's neck.

It is desirable that the size of the opening for the animal's neck be adjustable to accommodate different types and sizes of animals. Presently, so far as Applicants are aware, such adjustment is achieved by varying the spacing between the upright posts, as illustrated in U.S. Pat. Nos. 4,771,737 and 4,302,908, or by employing a mechanism that surrounds the animal's neck, such as the headgate described in U.S. Pat. No. 4,059,073. It is also desirable to allow for adjustment of the shape of the headgate opening, that the adjustment mechanism be readily incorporated into the manufacture and assembly of the headgate and that the headgate be adaptable for use with a variety of different squeeze chutes and other livestock handling and containment pens. Further, the headgate can be utilized to its maximum advantage if it allows the operator to easily adjust both the size and shape of the opening in which the animal is confined.

SUMMARY OF THE INVENTION

It is one object of the invention to provide an adjustable headgate allowing for easy adjustment of the size and shape of the opening in the headgate in which the animal is confined about its neck.

It is another object to provide neck confinement members made of a durable but resilient material to minimize the risk of injury to the animal and to reduce wear and tear on the operator during repeated opening and closing operations.

According to the present invention, these and other objects and advantages are achieved by a headgate that includes a pair of spaced apart stanchions operable to move from an open position to a closed position in which the animal is confined about its neck. A pair of opposing yokes positioned along the stanchions define in part the size and shape of the opening in the headgate within which the animal is confined when the stanchions are in the closed position. The size and shape of this opening may be easily adjusted, as desired, by varying the size and shape of the yokes and adjusting their spacing along the stanchions.

In another aspect of the invention, a pair of opposing upper yokes are attached to the upper portion of the stanchions and a pair of opposing lower yokes are attached to the lower portion of the stanchions. The upper yokes, the lower yokes, and the middle portion of each stanchion between the upper and lower yokes define the opening within which the animal is confined. In yet another aspect of the invention, the yokes act as a means for stopping the stanchions in the closed position. The first and second yokes are positioned to contact one another when the stanchions are in the closed position and thereby provide the desired neck opening for confining the animal.

Generally, it is preferred that the yokes have a curved perimeter extending away from the stanchions. The yokes should be made of a durable but resilient material such as rubber or plastic to minimize the risk of injury to the animal and to reduce wear and tear on the operator during repeated opening and closing operations.

Additional objects, advantages and novel features of the invention will be set forth in part in the description that follows, and in part will become apparent to those skilled in the art upon examination of the following or may be learned by practice of the invention.

Figure 1:
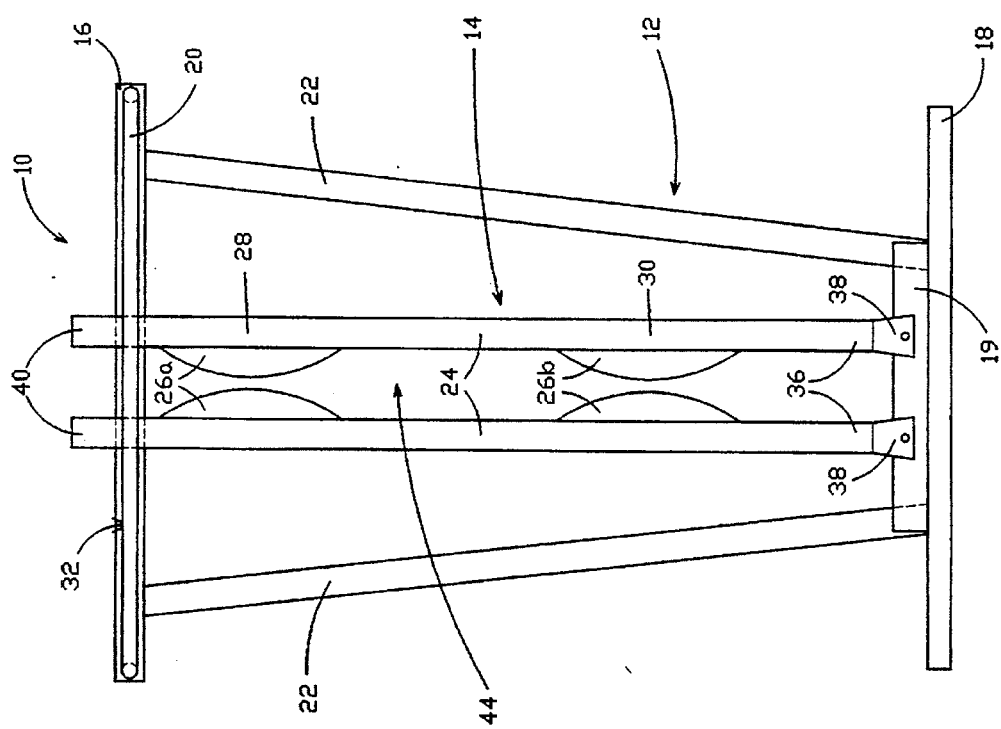
FIG. 1 is a front elevation view of the preferred embodiment of the invention, wherein the invention has been incorporated into a headgate having a pair of opposing stanchions that pivot within a vertical plane by means of a scissor action. The headgate is shown in the closed position.

The figures are not meant to be actual views of the various embodiments, but merely idealized representations used to illustrate the invention.

DETAILED DESCRIPTION OF THE INVENTION

One of the preferred embodiments of the invention is illustrated in FIGS. 1–4, wherein the invention has been incorporated into a headgate having a pair of opposing stanchions that pivot within a vertical plane by means of a scissor action. Headgate 10 comprises a frame assembly 12, a stanchion assembly 14 and an actuator assembly 50 (actuator assembly 50 is shown only in FIG. 2). Frame assembly 12 includes top cross piece 16, bottom cross piece 18, base plate 19, guide member 20 and uprights 22. Uprights 22 are attached to and extend between top cross piece 16 and bottom cross piece 18. Guide member 20 is preferably an elongated u-shaped steel pipe attached to top cross piece 16 to form guideway 32. Base plate 19 is attached to bottom cross piece 18 and extends between and is attached to the bottom of uprights 22.

Figure 3:
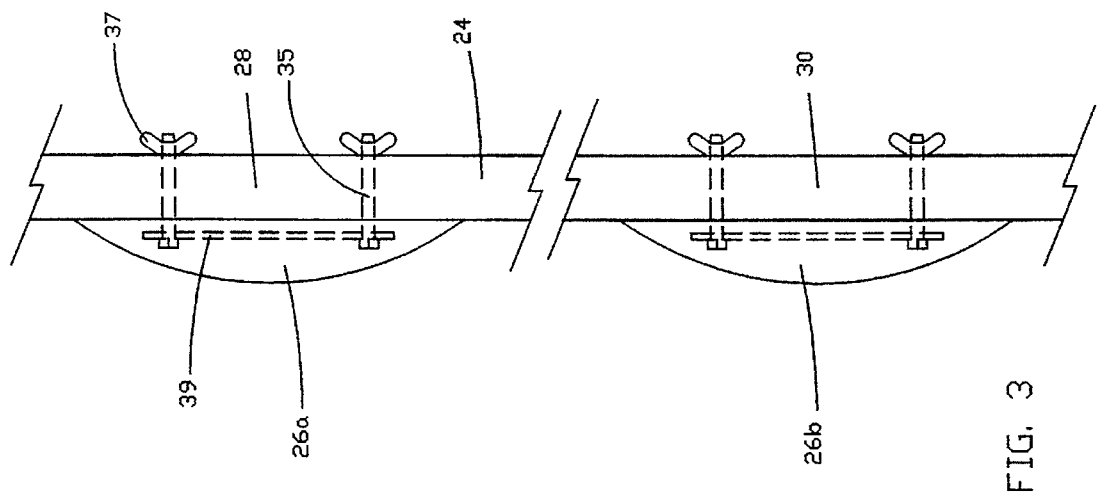
FIG. 3 is an expanded view showing attachment of the yokes to the stanchion.
Figure 4:
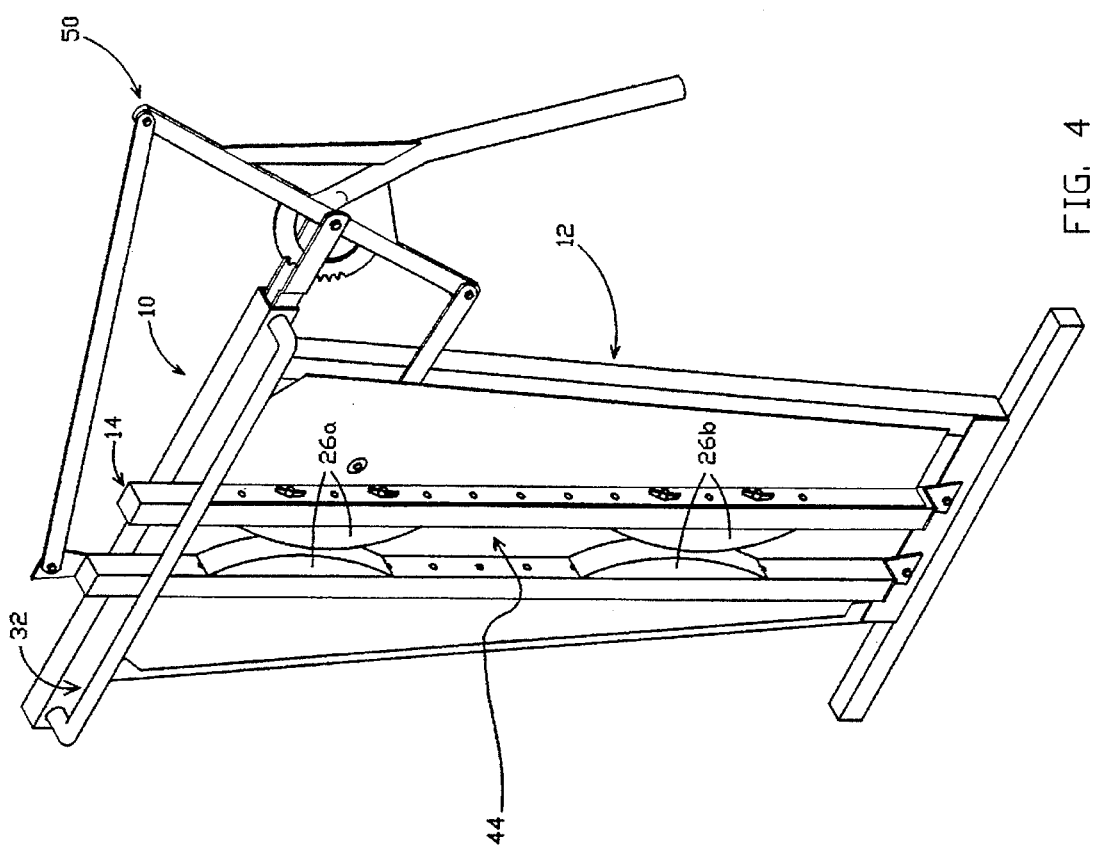
FIG. 4 is a perspective view of the headgate of FIG. 1.

Stanchion assembly 14 includes a pair of stanchions 24, stanchion sheets 33, a pair of opposing upper yokes 26a and a pair of opposing lower yokes 26b. Alternatively, a single pair of opposing yokes may be used. Stanchion sheets 33 are attached to stanchions 24 to prevent the animal from placing its head or legs through the space between stanchions and uprights 22. Upper yokes 26a are attached opposite one another to upper portions 28 of stanchions 24. Lower yokes 26b are attached opposite one another to lower portions 30 of stanchions 24. As shown in FIG. 3, the yokes are, preferably, attached to the stanchions with bolts 35 and wing nuts 37 so that each yoke may be easily positioned or re-positioned, as desired, in holes 34 spaced along the length of stanchions 24. Bolts 35 may be attached to each yoke in any conventional manner. For example, and as shown in FIG. 3, the head of bolts 35 are welded to a metal strap 39 which is imbedded in each yoke so that a threaded portion of bolts 35 protrude for attachment to the stanchions.

Brackets 38 are inserted in and attached to bottom ends 36 of stanchions 24. Bottom ends 36 of stanchions 24 are pivotally attached to base plate 19 through bracket 38. Alternatively, bottom ends 36 may be attached directly to base plate 19 (omitting brackets from the assembly) or directly to bottom cross piece 18 (omitting brackets and base plate 19 from the assembly). Top ends 40 of stanchions 24 extend up through guideway 32 between guide member 20 and top cross piece 16.

Stanchions 24 are opened and closed by means of actuator assembly 50. Actuator assembly 50 includes a ratchet mechanism 52 and handle 54 linked to stanchions 24. The ratchet mechanism 52 is a conventional pawl/ratchet combination (pawl not shown) that allows stanchions 24 to close freely when the operator pulls down on handle 54, but requires the operator to release the pawl from the ratchet before lifting handle 54 to open stanchions 24.

Top cross piece 16, bottom cross piece 18, uprights 22, guide member 20 and stanchions 24 may be made of steel tubing, steel pipe or other suitable structural materials. Attachments between the various components may be made by any appropriate conventional means such as welding, bolting or pinning.

Figure 2:
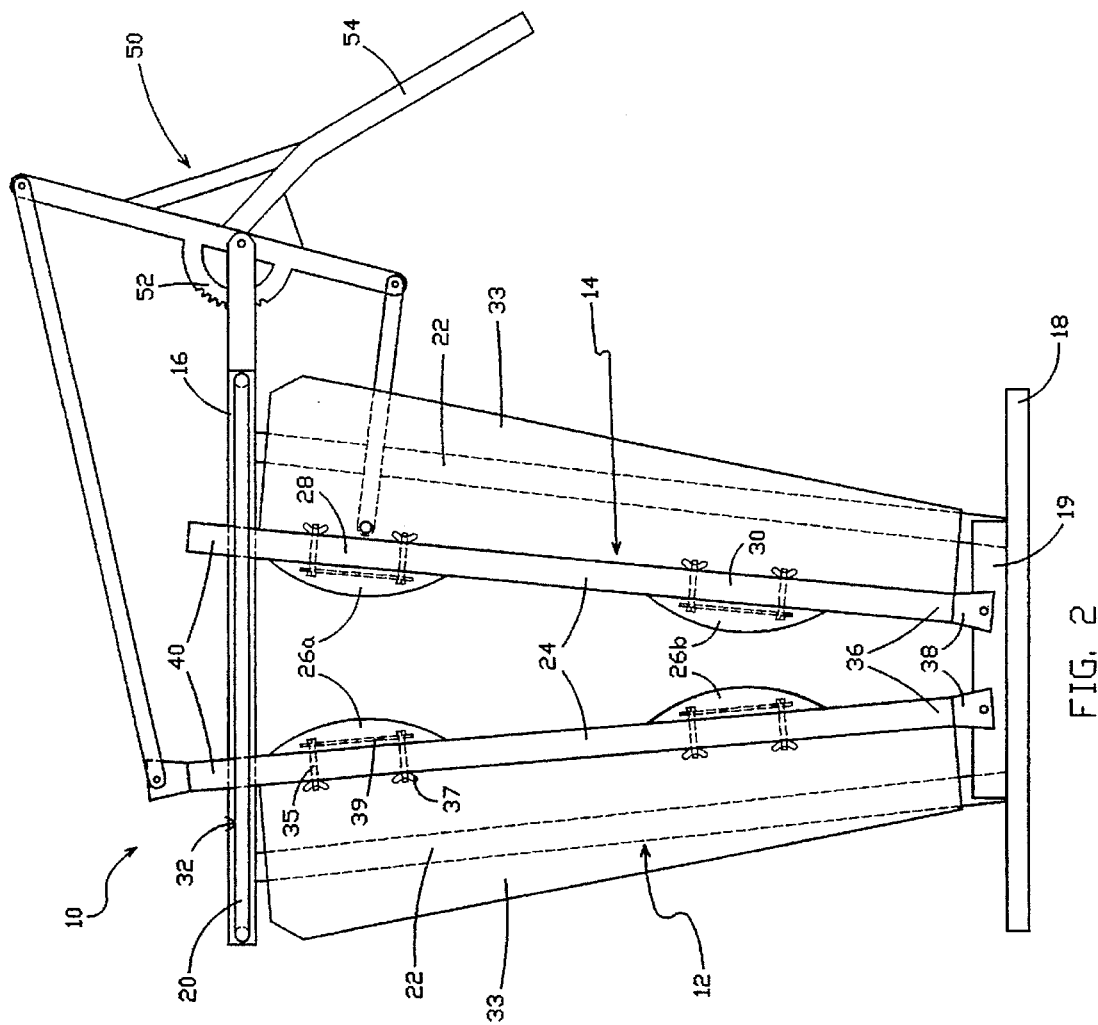
FIG. 2 is a front elevation view of the headgate of FIG. 1 shown in the open position with stanchion sheets and actuator assembly.

In operation, stanchions 24 are moved between open and closed positions. Typically, the stanchions will be partially opened to allow only the animal's head and neck to enter the headgate. The stanchions are then closed about the animal's neck. The animal is allowed to pass entirely through the headgate by fully opening the stanchions. The stanchions are moved from an open position to a closed position by pulling down on handle 54. The stanchions are moved from a closed position to an open position by releasing the pawl from the ratchet and lifting handle 54. FIG. 1 illustrates headgate 10 in a closed position and FIG. 2 illustrates headgate 10 in an open position. The relative open and closed positions of stanchions 24 may vary depending the size of the animal and the particular livestock handling operation.

The top ends 40 of stanchions 24 move along and are confined within guideway 32 as the headgate 10 is opened and closed. Upper yokes 26a, lower yokes 26b and middle portions 42 of stanchions 24 define an opening 44 in which the animal is confined about its neck when the headgate is closed. The yokes may be positioned as necessary along stanchions 24 to obtain the desired location, size and shape of opening 44. In addition, the size and shape of the yokes may be varied to adjust opening 44. Semicircular disc shaped yokes are used in the preferred embodiment shown in FIGS. 1 and 2, but yokes having various curved, straight or squared perimeters might also be used. One of the advantages of the invention is the degree to which the configuration and character of opening 44 can be easily adapted to meet different livestock handling requirements. Yokes 26a and 26b are preferably made of a durable resilient material, such as rubber, polyurethane, plastic or the like.

These materials can readily be made to have a natural, textured or other non-slip surfaces. Such resilient materials reduce the risk of injury to the animal.

Figure 5:
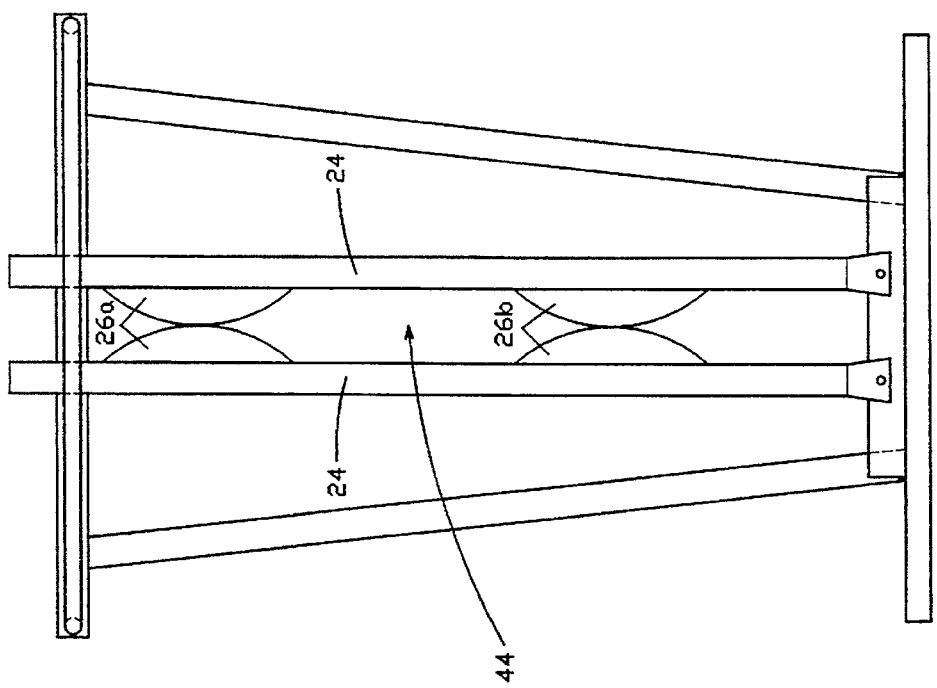
FIG. 5 is a frown elevation view showing another embodiment of the invention wherein the yokes are sized and shaped to contact one another along their respective perimeters when the headgate is closed.

In another embodiment of the invention, illustrated in FIG. 5, the yokes are sized and shaped to contact one another along their respective perimeters when the headgate is in the closed position. Configured in this way, the yokes serve as a means for stopping the stanchions as they move to the closed position as well as defining the location, size and shape of opening 44, in which the neck of the animal will be confined. Again, yokes 26a and 26b preferably have a curved perimeter so that contact is made tangentially along the perimeter of the yokes. However, yokes 26a and 26b may have a variety of perimeter shapes as long as contact will be made between the yokes to stop the closure of the stanchions. Using the yokes in this way reduces operator fatigue during operations where the headgate is repeatedly opened and closed as, for instance, during branding of cattle.

Figure 6:
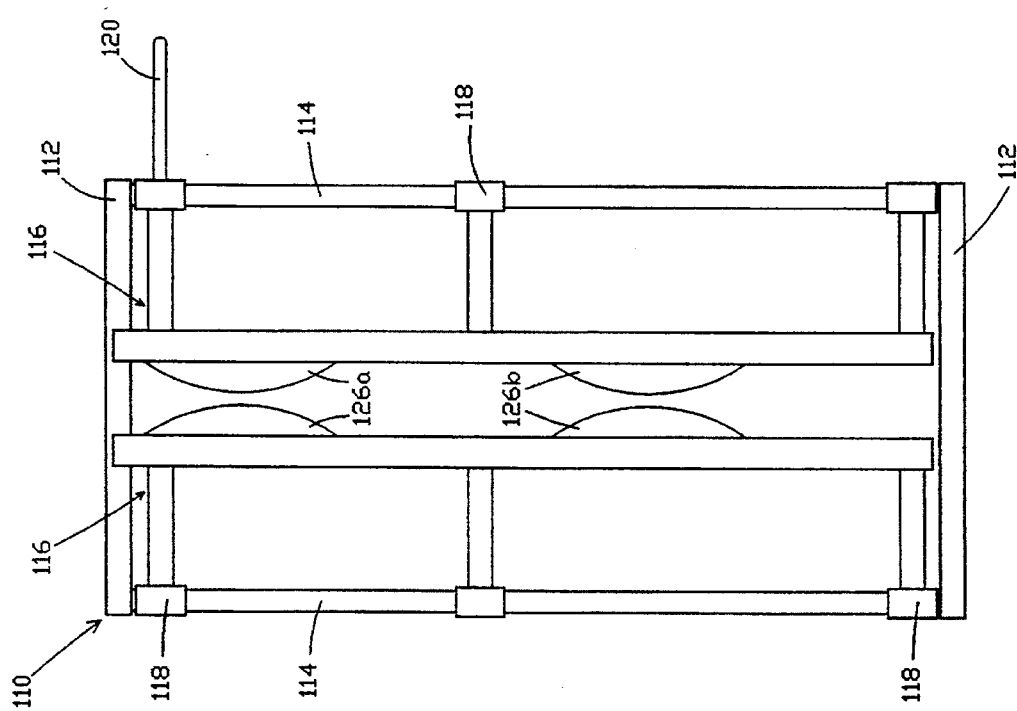
FIG. 6 is a frown elevation view showing another embodiment of the invention wherein the invention has been incorporated into a headgate having a set of swing doors that pivot in and out of a vertical plane.

In another preferred embodiment of the invention, illustrated in FIG. 6, the invention is incorporated into a headgate having a set of swing doors that pivot in an out of a vertical plane. The headgate comprises a rectangular frame 110 having two parallel cross members 112 attached to two parallel posts 114. Two swing doors 116 are mounted on posts by hinge mounts 118 for pivotal movement around the vertical axis of posts 114. The swing doors are opened and closed by pulling or pushing lever 120.

Some well known aspects of the structure and operation of the swing door headgate have been simplified herein for convenience in illustrating the invention. For instance, operation of the swing doors will typically include a catch mechanism to lock the doors in the closed and/or open position. Also, the separation distance between the adjacent doors may be varied by moving the panels along supporting rails and swing positions of the doors may be controlled by a positioning device mounted above the doors, as described in U.S. Pat. No. 4,302,908, incorporated herein by reference.

A pair of opposing upper yokes 126a and a pair of opposing lower yokes 126b are attached to the forward edges of swing doors 116. The yokes may be attached to the swing doors with bolts and wing nuts so that each yoke may be easily positioned or re-positioned, as desired, along the length of the forward edges of swing doors 116. Upper yokes 126a, lower yokes 126b and the exposed portions of the forward edges of the swing doors define an opening in which the animal is confined about its neck when the headgate is in the closed position. The yokes may be sized and shaped and positioned as necessary along the forward edges of swing doors 116 to obtain the desired location, size and shape of the opening. Yokes 126a and 126b are made of a durable resilient material, such as rubber, polyurethane, plastic or the like.

There has been shown and described a novel livestock headgate wherein curved perimeter yokes made of a resilient material are used to define and adjust the location, size and shape of the headgate opening in which an animal is confined. The particular embodiments shown in the drawings and described herein are for purposes of example only and should not be construed to limit the scope of the invention as set forth in the following claims.

It is claimed:

1. A headgate, which comprises:

a. a pair of spaced apart stanchions operable to move from an open position to a closed position;

b. an opening in the headgate, the opening being sized and shaped so that the animal is confined about its neck within the opening when the stanchions are in the closed position; and c. opposing yokes positioned along the stanchions, the yokes having a curved perimeter extending away from the stanchions defining at least in part the size and shape of the opening.

2. A headgate according to claim 1, wherein the yokes are made of a resilient material.

3. A headgate according to claim 1, wherein the yokes are made of rubber.

4. A headgate according to claim 1, wherein the yokes are made of plastic.

5. A headgate according to claim 1, wherein the yokes are removably attached to the stanchions.

6. A headgate according to claim 1, wherein the yokes are fixedly attached to the stanchions.

7. A headgate according to claim 1, further comprising an adjustment means for adjusting the position of the yokes along the stanchions thereby changing the size and shape of the opening.

8. A headgate according to claim 7, wherein the adjusting means comprises:

a. a plurality of evenly spaced apart holes positioned along and formed through the stanchions; and b. a plurality of bolts affixed to each yoke and positioned so that the bolts in each yoke may be inserted through holes in the stanchion and secured thereto with nuts.

9. A headgate, which comprises:

a. a pair of spaced apart stanchions operable to move from an open position to a closed position in which the animal is confined about its neck;

b. a pair of opposing upper yokes attached to an upper portion of the stanchions;

c. a pair of opposing lower yokes attached to a lower portion of the stanchions; and d. the yokes have a curved perimeter extending away from the stanchions.

10. A headgate according to claim 9, wherein the yokes are made of a resilient material.

11. A headgate according to claim 9, wherein the perimeter of the upper yokes, the perimeter of the lower yokes, and a middle portion of each stanchion between the upper and lower yokes define an opening in which the animal is confined about its neck when the stanchions are in the closed position.

12. A headgate according to claim 11, further comprising an adjustment means for adjusting the position of the yokes along the stanchions thereby changing the size and shape of the opening.

13. A headgate according to claim 12, wherein the adjusting means comprises:

a. a plurality of evenly spaced apart holes positioned along and formed through the stanchions; and b. a plurality of bolts affixed to each yoke and positioned so that the bolts in each yoke may be inserted through holes in the stanchion and secured thereto with nuts.

14. A headgate, which comprises:

a. a frame assembly comprising a top cross piece, a bottom cross piece, and a pair of uprights attached to and extending between the top cross piece and the bottom cross piece;

b. a stanchion assembly connected to the frame assembly, the stanchion assembly comprising a pair of stanchions operable to move from an open position to a closed position in which the animal is confined about its neck, a pair of opposing upper yokes attached to an upper portion of the stanchions, a pair of opposing lower yokes attached to a lower portion of the stanchions, a middle portion of the stanchions between the upper and lower yokes, wherein the stanchions define an opening in which the animal is confined about its neck when the stanchions are in the closed position; and c. the yokes have a curved perimeter extending away from the stanchions.

15. A headgate according to claim 14, wherein the yokes are made of a resilient material.

16. A headgate which comprises:

a. a frame assembly comprising a top cross piece a bottom cross piece, and a pair of uprights attached to and extending between the top cross piece and the bottom cross piece;

b. a stanchion assembly connected to the frame assembly, the stanchion assembly comprising a pair of stanchions operable to move from an open position to a closed position in which the animal is confined about its neck, a pair of opposing upper yokes attached to an upper portion of the stanchions, a pair of opposing lower yokes attached to a lower portion of the stanchions, a middle portion of the stanchions between the upper and lower yokes, wherein the stanchions define an opening in which the animal is confined about its neck when the stanchions are in the closed position;

c. an elongated u-shaped guide member attached to the top cross piece to form a guideway along and adjacent to the top cross piece; and d. top ends of the stanchions positioned within the guideway.

17. A headgate which comprises:

a. first and second stanchions operable to move from an open position to a closed position in which the animal is confined about its neck;

b. a pair of opposing upper yokes attached to the stanchions, each upper yoke having a curved perimeter extending away from the stanchion;

c. a pair of opposing lower yokes attached to the stanchions, each lower yoke having a curved perimeter extending away from the stanchion; and d. wherein the yokes contact one another along a tangent of the curved perimeter of each yoke when the stanchions are moved to the closed position.

18. A headgate according to claim 17, further comprising an adjustment means for adjusting the position of the yokes along the stanchions.

19. A headgate according to claim 17, wherein:

a. the stanchions each have a plurality of holes therethrough, the holes being evenly spaced along the stanchions;

b. the yokes each have a plurality of bolts affixed thereto; and c. the yokes are attached to the stanchions by inserting each bolt through a hole and securing each bolt so inserted with a nut.

20. A headgate according to claim 17, wherein the yokes are made of a resilient material.

* * * * *